United States Patent [19]
Nakata

[11] Patent Number: 5,036,438
[45] Date of Patent: Jul. 30, 1991

[54] PROJECTOR-TYPE HEAD LAMP FOR MOTOR VEHICLES

[75] Inventor: Yutaka Nakata, Isehara, Japan

[73] Assignee: Ichikoh Industries, Ltd., Tokyo, Japan

[21] Appl. No.: 502,224

[22] Filed: Mar. 30, 1990

[30] Foreign Application Priority Data

Mar. 31, 1989 [JP] Japan .................................. 1-78520

[51] Int. Cl.[5] .............................................. B60Q 1/00
[52] U.S. Cl. ........................................ 362/61; 362/80; 362/308; 362/328
[58] Field of Search .................. 362/61, 80, 328, 329, 362/308

[56] References Cited

U.S. PATENT DOCUMENTS

| | | | |
|---|---|---|---|
| 3,578,966 | 5/1971 | Levin | 362/61 |
| 4,100,594 | 7/1978 | Gould | 362/308 |
| 4,517,630 | 5/1985 | Dieffenbach et al. | 362/328 |
| 4,562,519 | 12/1985 | Deves | 362/308 |
| 4,771,372 | 9/1988 | Litetar et al. | 362/307 |
| 4,796,171 | 1/1989 | Lindae et al. | 362/329 |
| 4,814,950 | 3/1989 | Nakata | 362/61 |

FOREIGN PATENT DOCUMENTS

| | | | |
|---|---|---|---|
| 0186701 | 7/1989 | Japan | 362/61 |

*Primary Examiner*—Ira S. Lazarus
*Assistant Examiner*—Sue Hagarman
*Attorney, Agent, or Firm*—Foley & Lardner

[57] ABSTRACT

In a projector-type head lamp, a reflector having a concave inner reflecting surface, a light source, a shade with a cut-off edge and a projection lens are arranged in order. The inner reflecting surface of the reflector has at least 2 foci and is so designed as to reflect the rays of light emitted from the light source in a direction crossing the optical axis. The light source is disposed near one of the foci of the reflector while the cut-off edge of the shade is arranged in the vicinity of the other focus. The projection lens has an optical axis nearly coincident with that of the reflector and is so formed that the power of refraction thereof becomes progressively greater from the optical axis toward the outer circumference, namely, its peripheral lens area has a focus located in the vicinity of the cut-off edge while its central lens area has a focus located between the cut-off edge and the light source. The colored rays having passed through the peripheral lens area near the outer circumference of the projection lens form a sharp image of the cut-off edge of the shade on a screen, while the white rays having passed through the central lens area in which the optical axis lies form a blurry image of the cut-off edge on the screen. In an illumination pattern defined on the screen, the color fringes formed in the vicinity of the cut-off line are covered by the blurry image defined by the white rays having passed through the central lens area, thereby making the color fringes sufficiently unnoticeable.

5 Claims, 4 Drawing Sheets

PROJECTOR-TYPE HEAD LAMP FOR MOTOR VEHICLES

BACKGROUND OF THE INVENTION a) Field of the Invention

The present invention relates to a projector-type head lamp for motor vehicles, and more particularly to a projector-type head lamp which will not have an undesirable color fringe from chromatic aberration inavoidably taking place in this type of head lamp.

b) Description of the Prior Art

The well known projector-type head lamp for motor vehicles comprises a reflector with a spheroidal inner reflecting surface, a light source located at the first focus of the reflector, a shade having a cut-off edge in the vicinity of the second focus of the reflector, and a projection lens consisting of a single lens element, these being arranged in order. The illumination pattern at the shade is projected or focused on the roadway through the projection lens, but there develops at the light-dark border of the projected illumination pattern undesirable color fringing from chromatic aberration. To avoid such color fringing, some techniques or methods have been proposed to make less noticeable a color fringe by shifting or deflecting into the white zone the rays of light resulting in the color fringe from near the light-dark border. To this end, (1) U.S. Pat. No. 4,562,519 discloses a head lamp in which localized deflector elements are provided at the upper part and the lower part of the lens to produce a lateral dispersion and/or lowering of the light passing through these parts of the lens in order to reduce the effects of the chromatic aberration in the vicinity of the cut-off, and (2) U.S. Pat. No. 4,771,372 discloses a head lamp having means for at least reducing a color fringe otherwise present on the light-dark boundary of the light beam from chromatic aberration and including a correction element arrangeable in the path of the light beam and associated with the achromatic lens. In these conventional head lamps, the localized deflector elements or correction element are arranged integrally with or adjacent to the single lens element but the single lens element itself lacks the effects to deflect the rays of light forming the color fringe and reduce the color fringe. Hence, the localized deflector elements or correction element have to be manufactured with high precision, bearing in mind the relation with the achromatic lens. A further projector-type head lamp is known from the U.S. Pat. No. 4,100,594, which comprises a light source, a projection lens composed of first and second parts disposed on opposite sides of a plane, a single or a pair of masks disposed between the light source and the projection lens to define a cut-off in the projected beam. In this type of projector-type head lamp, color fringing is reduced by the use of a mask having separate front and rear edges or by splitting the projection lens into upper and lower halves, the arrangement in each case producing both a virtual and a real inverted mask images from the other half, thereby strongly colored rays are superimposed on the brightly illuminated area of the projected beam pattern where they have little effect on the overall color of the light while the least colored rays from the sharp cut-off edge and a region of reduced brightness adjacent to it. However, the mask forming such projector-type head lamp is formed having separate front and rear edges or the projection lens is formed as split in upper and lower halves, so that the optical system is complex and the mask and split projection lens have to be manufactured with high precision and have a correctly adjusted mutual relation between them.

SUMMARY OF THE INVENTION

An object of the present invention is to provide a projector-type head lamp for motor vehicles, capable of making a color fringe developed in the vicinity of the light-dark border sufficiently unnoticeable and which has a simple optical system.

Another object is to provide a projector-type head lamp having a single projection lens specially designed for blurring or spreading the given white rays of light to cover the color fringes.

The above objects of the present invention can be attained by providing a projector-type head lamp comprising a reflector of which the inner reflecting surface is formed having at least 2 foci (the straight line connecting these foci defining the optical axis of the reflector), a light source disposed close to the one of the foci that is nearer to the reflector, a shade of which the cut-off edge is disposed in the vicinity of the other focus far from the reflector, and a projection lens having an optical axis nearly coincident with that of the reflector and of which the power of refraction is little by little larger from the optical axis toward the outer circumference thereof. The above-mentioned projection lens should preferably have a peripheral lens area located near the outer circumference thereof and where light beam is split up into colored rays, the power of refraction thereof being so determined that the rays of light emitted from a point source at an infinitely far point on the optical axis and incident upon the frontal surface thereof are refracted toward a point (convergence point) located near the cut-off edge of the shade, and a central lens area in which the optical axis lies and of which the power of refraction is so determined that the rays of light emitted from the point source at an infinitely far point on the optical axis are refracted toward a predetermined point located between the cut-off edge of the shade and the light source.

In the projector-type head lamp having such an optical system, the colored rays reflected at the reflector and passing through the peripheral lens area near the outer circumference of the projection lens form a sharp image of the cut-off edge of the shade on a screen, but the white rays reflected by the reflector and passing through the central lens area in which the optical axis lies will form a blurr image of the cut-off edge of the shade on the screen. In the illumination pattern on the screen, the color fringes formed in the vicinity of the cut-off line will be covered by the blurr image formed by the white rays passing through the central lens area, so that the color fringes which will not be so noticeable. The difference in power of refraction between the central lens area in which the optical axis lies and the peripheral lens area close to the outer circumference should be determined to be within a minimum range in which the blurr image formed by the white ranges covers the color fringes.

The projection lens of the above-mentioned type comprises an innermost lens area in which the optical axis lies, with which a plurality of lens areas contiguous to the innermost lens area form a central lens area, and a peripheral lens area contiguous to the central lens area, and it can be so designed as to have a frontal surface and a back surface. The innermost lens area of the central lens area can be so designed as to refract toward a predetermined convergence point located between the light source and cut-off edge of a shade the rays of light emitted from a point source at an infinitely far point on the optical axis and incident upon the frontal surface, while the other lens areas can be so designed as to refract toward other different points located between the predetermined convergence point and the cut-off edge of the shade the respective rays of light emitted from the point source at the infinitely far point on the optical axis and incident upon the frontal surface. Also, the peripheral lens area can be so designed as to refract substantially toward the cut-off edge of the shade the respective rays of light emitted from the point source at the infinitely far point on the optical axis and incident upon the frontal surface.

The plurality of lens areas forming the central lens area can be so formed as to refract toward the points nearer to the cut-off edge of the shade the respective rays of light emitted from the point source at the infinitely far point on the optical axis and incident upon the front surface.

DETAILED DESCRIPTION OF THE PREFERRED EMBODIMENTS

Figure 1:
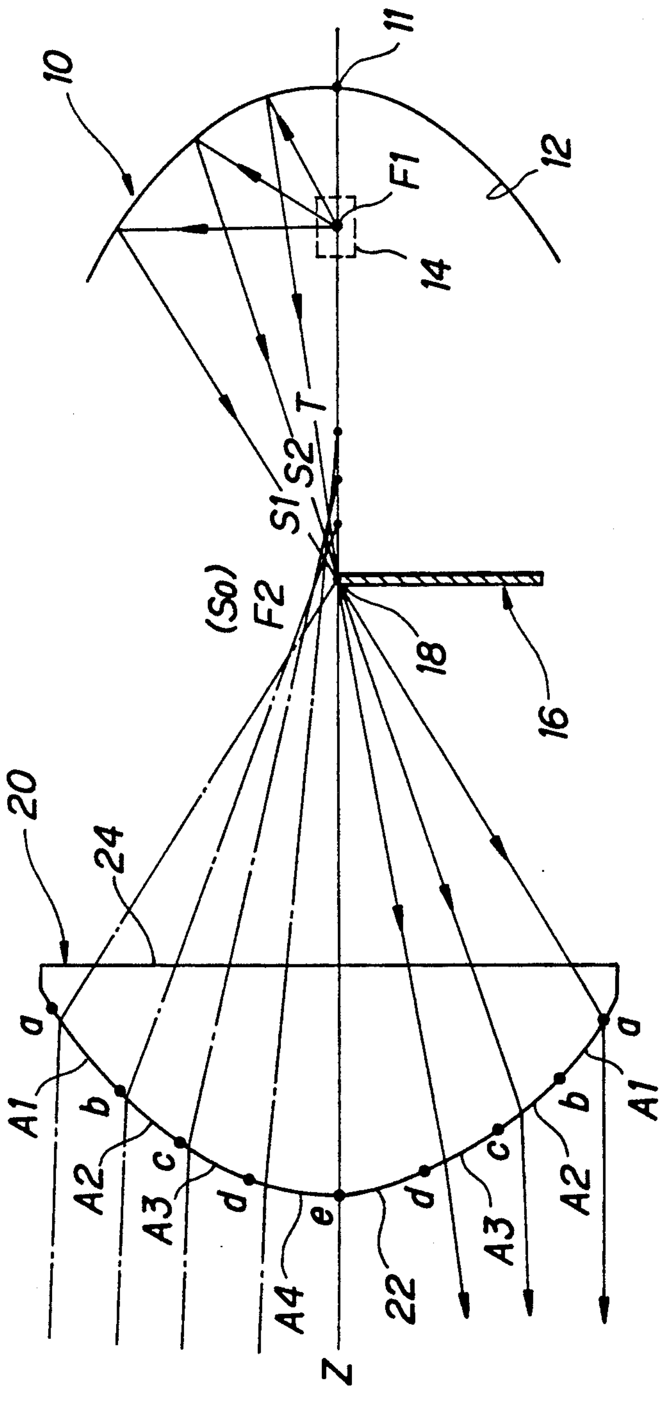
FIG. 1 is a schematic diagram of the optical system in one embodiment of the projector-type head lamp according to the present invention.

FIG. 1 shows one embodiment of the projector-type head lamp according to the present invention, there being disposed a reflector 10 having a spheroidal inner reflecting surface 12, a light source 14, a shade 16 having a cut-off edge 18, and a projection lens 20.

Figure 2:
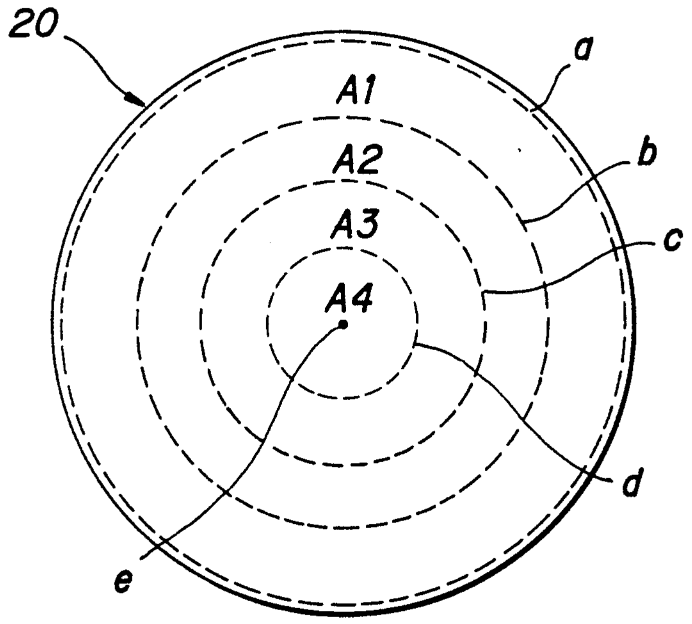
FIG. 2 is a front view of the projection lens in FIG. 1, showing the plurality of lens areas composing the projection lens.

The optical axis of the reflector 10 is disposed nearly coincident with that of the projection lens 20 (this optical axis will be referred to as "optical axis Z" hereinafter), and the upper end of the cut-off edge 18 of the shade 16 is kept at nearly the same level as the optical axis Z. The light source 14 is disposed having the center of the filament thereof made generally coincident with the focus Fl closer to the apex 11 of the reflector 10, while the shade 16 is disposed having the center of the upper end of the cut-off edge 18 thereof made nearly coincident with the focus F2 farther from the apex 11 of the reflector 10. The projection lens 20 in the projector-type head lamp according to the present invention is formed by a single lens element, but it is so designed that the power of refraction thereof is enlarged little by little from the optical axis Z toward the outer circumference. Namely, the projection lens 20 is given a power of refraction which depends upon the distance from the optical axis Z. This will be explained in further detail below. The projection lens 20 comprises an outermost lens area A1 close to the outer circumference farthest from the optical axis Z, two lens areas A2 and A3 adjacent to the lens area A1, and an innermost lens area A4 adjoining the lens area A3 and in which the optical axis Z lies, and it has a front surface 22 and a back surface 24. The lens area A1 is an area which substantially contributes to the forming of color fringes caused by color split-up, and this area will be referred to as "peripheral lens area" herebelow. The lens areas A2, A3 and A4 do not contribute as much to the forming of such color fringes. These lens areas will be referred to as "central lens areas" respectively herebelow. As shown in FIG. 2, the peripheral lens area A1 and central lens areas A2 and A3 are formed as lens areas defined by the aspherical frontal surface 22 and nearly vertically flat back surface 24, respectively, formed between concentric circles a and b, b and c, and c and d about the optical axis Z, respectively, while the innermost lens area A4 is formed as a lens area defined by the aspherical frontal surface 22 defined between a circle d about the optical axis Z and a point e on the optical axis Z and a nearly vertically flat back surface 24.

Figure 3A:
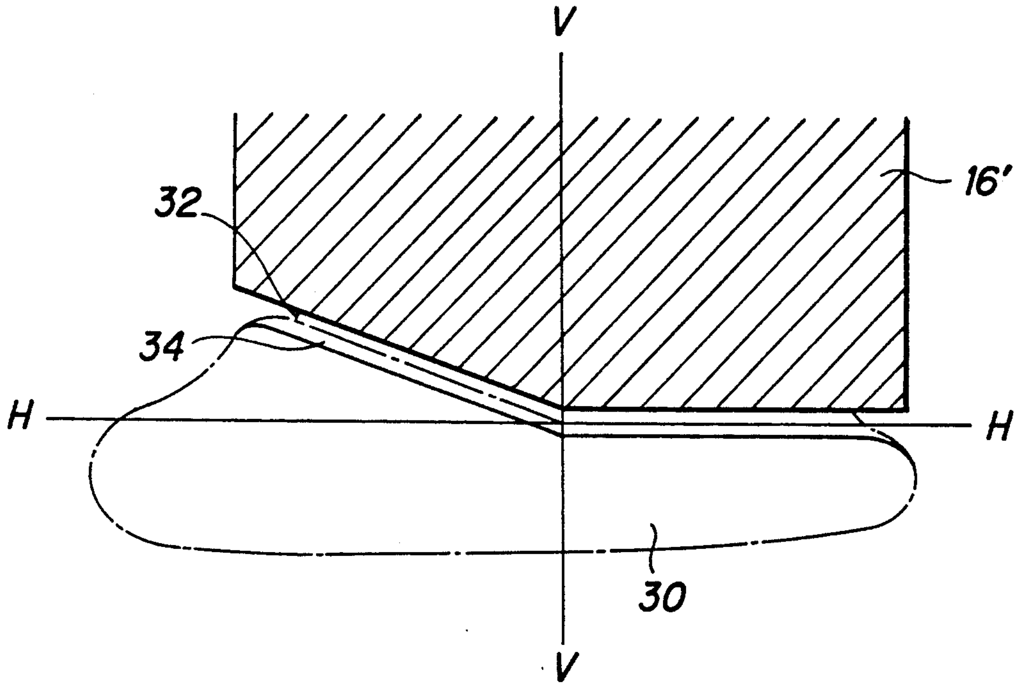
FIG. 3 (A) and FIG. 3 (B) are schematic diagrams of the light projection pattern for explanation of the function and effect of the optical system.
Figure 3B:
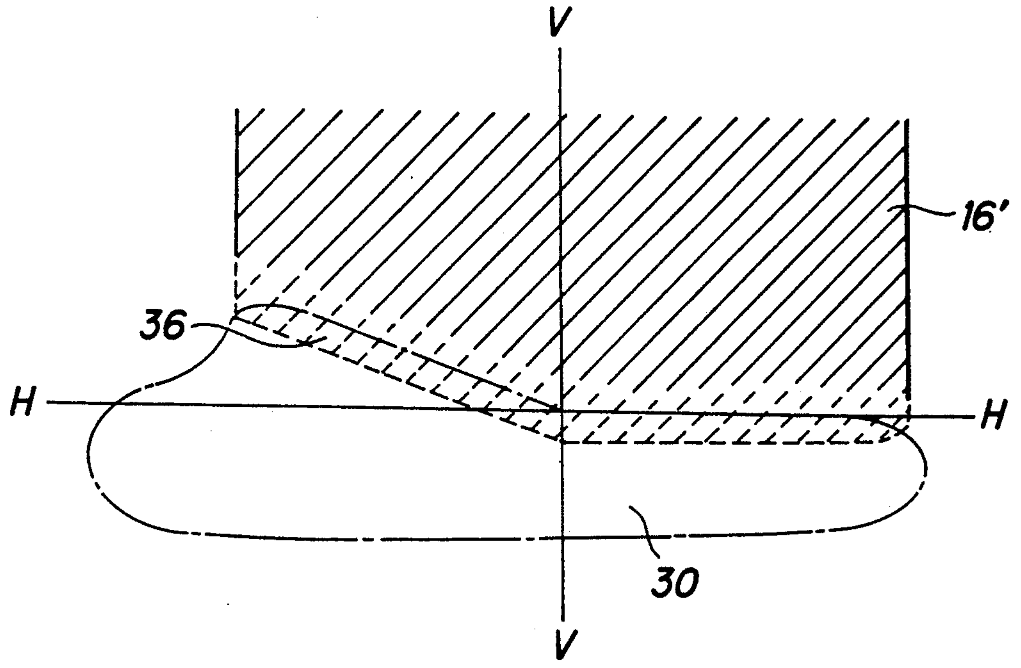

The innermost lens area A4 is designed to refract toward a predetermined point T located between a point light source 14 and shade 16, the rays of light emitted from the light source 14 at an infinitely far point on the optical axis Z and incident upon the frontal surface 22; the peripheral lens area A1 is designed to refract the rays of light emitted from the point source at the infinitely far point on the optical axis Z and incident upon the frontal surface 22 toward a point S0 substantially coincident with the cut-off edge 18 of the shade 16, that is, a point substantially coincident with the other focus F2 of the reflector; and the remaining lens areas A2 and A3 are designed to refract toward points S1 and S2, respectively, on the optical axis Z the rays of light emitted from the point source at the infinitely far point on the optical axis Z and incident upon the front surface 22. Namely, the lens area farther from the optical axis Z refracts toward a point closer to the focus F2 of the reflector, that is, the cut-off edge 18 of the shade 16, the rays of light emitted from the point source at the infinitely far point on the optical axis Z and incident upon the frontal surface 22. Therefore, the rays of light emitted from the light source 14 and reflected at the inner reflecting surface 12 of the reflector 10 are converged toward the focus F2 of the reflector. Namely, those of the rays of light passing near the upper end of the cut-off edge 18 of the shade 16 and incident upon the back surface 24 of the projection lens 20, which have passed through the peripheral lens area A1, will go out in a direction nearly parallel to the optical axis Z as shown in FIG. 1 (A), and they form a sharp image of the cut-off edge 18 of the shade 16 on a screen located in front of the projection lens 20. The incident rays of light are subject to a color splitting by the peripheral lens area A1 into a red spectral zone 32 and purple spectral zone 34 on the screen. The rays of light having passed through the central lens areas A2 and A3, respectively, nearer to the optical axis Z than the peripheral lens area A1, go out in a direction somewhat away from the optical axis Z, that is, outwardly as shown in FIG. 1 (A) (the rays of light having passed through the lens area A3 go slightly more outwardly than those having passed through the lens area A2) to form a more blurry image of the shade 16 on the screen. Further, the rays of light having passed through the innermost lens area A4 go out more outwardly than those having passed through the lens area A3, to form a blurry image of the cut-off edge 18 of the shade 16 on the screen. The blurry images of the cut-off edge 18 of the shade 16, formed on the screen by these rays of light having passed through the central lens areas A2, A3 and A4, will define blurry zones 36, respectively, in a range which covers the sharp image of the cut-off edge 18, formed by the rays of light having passed through the peripheral lens area A1 as shown in FIG. 3 (B). Hence, the red spectral zone 32 and purple spectral zone 34, formed by the rays of light having passed through the peripheral lens area A1, lie in the white spectral blurry zone 36, so their existence will not be noticeable. Further, it will be apparent to those skilled in the art that since the image of the cut-off edge 18 of the shade 16 is generally a blurry one, the illuminance of the light-dark boundary zone between the illumination pattern 30 defined on the screen by the projection lens 20 of the above-mentioned type and the shadow of the shade 16, that is, the dark zone 16', is little by little lower from the center of the illumination pattern 30 toward the dark zone 16'. Positive formation of such blurry zone 36 between the illumination pattern 30 and the dark zone 16' will secure a safe front field of vision for the driver.

The projection lens 20 comprises the four lens areas, that is, the central lens areas A2, A3 and A4 and the peripheral lens area A1; however, it should not be limited to this design but may be composed of a plurality of annular lens areas smoothly contiguous to each other and of which the power of refraction is little by little greater from the center toward the outer circumference. The outermost lens area close to the outer circumference of the projection lens may be so formed as to refract the rays of light emitted from the point source at the infinitely far point on the optical axis and incident upon the front surface thereof toward a point substantially coincident with the central upper end of the cut-off edge of the shade; the innermost lens area near the optical axis be so formed as to refract the rays of light emitted from the point source at the infinitely far point on the optical axis and incident upon the front surface thereof toward a predetermined point located between the central upper end of the cut-off edge of the shade and the light source; and the lens area between the outermost and innermost lens areas be so formed by a plurality of annular lens areas smoothly contiguous to each other as to refract the rays of light toward many different points, respectively, located between the central upper end of the cut-off edge of the shade and the above-mentioned predetermined point.

In the above-mentioned optical system, the diameter of the projection lens 20 is selected to be about 60 mm, the distance from the center of the lens to the central upper end of the cut-off edge 18 of the shade 16 is to be about 55 mm, the distance from the apex 11 of the reflector 10 to the central upper end of the cut-off edge 18 of the shade 16 is to be about 60 mm, and the distance from the central upper end of the cut-off edge 18 to the point T is to be about 5 mm.

Figure 4:
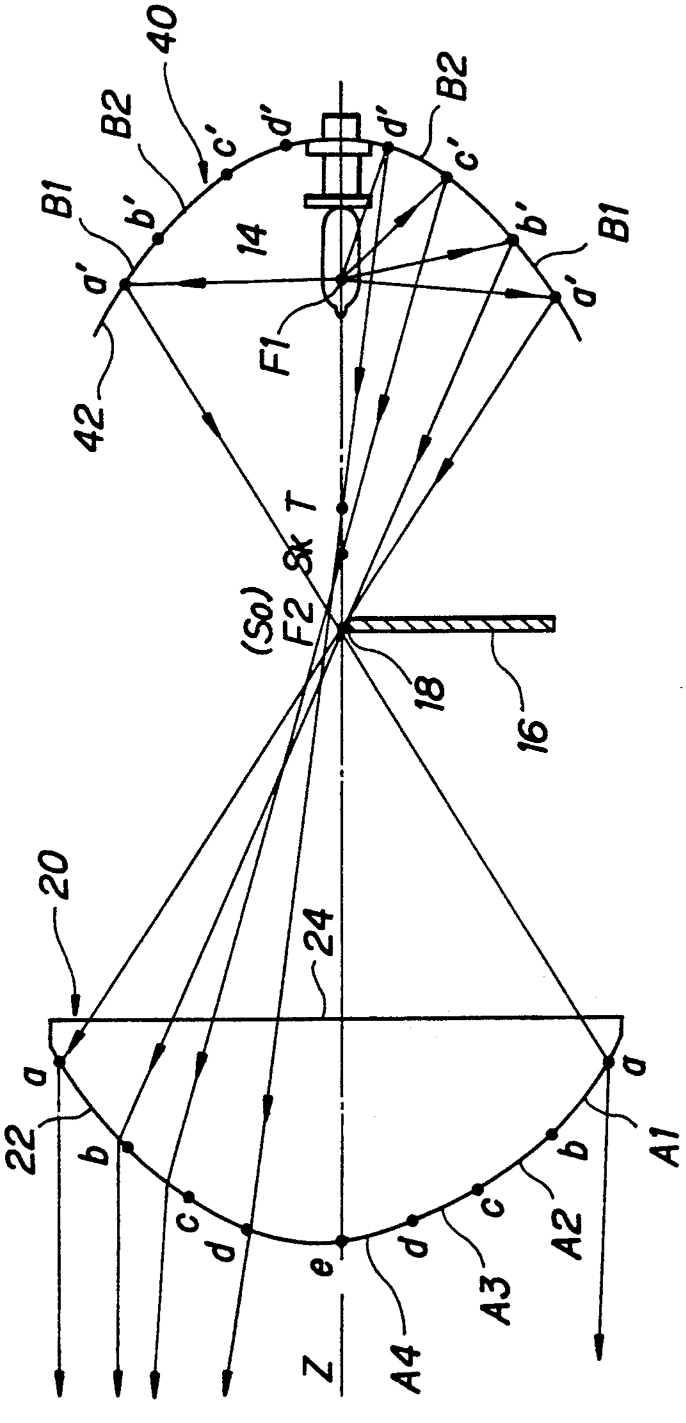
FIG. 4 is a schematic diagram of the optical system in another embodiment of the projector-type head lamp according to the present invention.

FIG. 4 schematically shows the optical system in a second embodiment of the projector-type head lamp according to the present invention. In this embodiment, the same reference numerals as in FIG. 1 indicate the same elements as in the first embodiment shown in FIG. 1, but the inner reflecting surface of the reflector has different reflecting characteristics from those of the reflector in the first embodiment. The reflector in the second embodiment is generally indicated at 40 while the inner reflecting surface thereof is at 42. The optical system of this type and the reflecting characteristics of the inner reflecting surface 42 of the reflector 40 will be described in detail below.

In FIG. 4, the reference symbols a', b', c' and d' represent concentric circles, respectively, of which the radii about the optical axis Z are different from one another. The outer reflecting area B1 located between a' and b' is so formed as to reflect the rays of light from the light source 14 toward a point So close to the cut-off edge 18 of the previously-mentioned shade 16, and the inner reflecting area B2 located between b' and d' is so formed as to reflect the rays of light from the light source 14 toward many different points (which are collectively indicated with a single point Sk for the simplicity of the illustration and explanation) on the optical axis and which are located between the point T and the point So in the vicinity of the cut-off edge 18 of the shade correspondingly to their distance from the optical axis Z. In practice, the outer reflecting area B1 is composed of a part of a spheroid having the foci thereof at the center F1 of the filament of the light source 14 and the point F2 close to the cut-off edge 18, respectively, while the inner reflecting area B2 is so formed that the reflecting area thereof close to the concentric circle d' of the minimum radius about the optical axis Z reflects the rays of light from the light source 14 toward the predetermined point T and the inner reflecting areas thereof located between the concentric circles b' and d' reflect the rays of light from the light source 14 toward the points closer to the cut-off edge 18 of the shade. Namely, the inner reflecting areas B2 located between the concentric circles b' and d' can be made similar to a reflecting area composed of a plurality of spheroids smoothly contiguous to each other and which take as a common focus the filament center F1 of the light source 14 while having their respective focci between the points T and So. Such spheroid-like reflecting area B2 is so designed as to reflect the rays of light from the light source 14 toward many different points Sk on the optical axis Z and located between the point T and the point So close to the cut-off edge 18 of the shade correspondingly to their distance from the optical axis Z, but it will be apparent to those skilled in the art that since the size of the light source 14 is the substantially same as the distance from the central upper end of the cut-off edge 18 of the shade to the point T in practice, the most of the rays of light incident upon the lens areas A2, A3 and A4 of the projection lens 20 are refracted somewhat outwardly in a direction in which they are away from the optical axis Z in each of the lens areas.

The function of the optical system using such reflector 40 is as will be described below. First, the rays of light emitted from the light source 14 and reflected at the outer reflecting area B1 are converged at the point F2 close to the cut-off edge 18, thereafter incident upon the back surface 24 of the outermost lens area A1 of the projection lens 20, and directed frontwardly as refracted in a direction nearly parallel to the optical axis Z in the lens area A1. The rays of light emitted from the light source 14 and reflected at the reflecting area close to the concentric circle d' are converged near the predetermined point T, thereafter incident upon the back surface 24 of the innermost lens area A4 of the projection lens 20, and directed frontwardly as refracted in a direction somehow away from the optical axis Z in the lens area A4; and the rays of light emitted from the light source 14 and reflected at the reflecting area located between the concentric circles b' and d' are converged at the point Sk closer to the cut-off edge 18 of the shade as their distance from the optical axis Z is longer, thereafter incident upon the back surface 24 of the lens area A2 or A3 of the projection lens 20 and then directed frontwardly as refracted in a direction further slightly away from the optical axis Z in the lens area A2 or A3. Hence, as in the previously-described embodiment, the rays of light having passed through the peripheral lens area A1 form a sharp image of the cut-off edge 18 and also define a red spectral zone and purple spectral zone in the vicinity of the cut-off edge image. However, it will be apparent to those skilled in the art that since the rays of light having passed through the central lens areas A2, A3 and A4 form a blurry image of the cut-off edge 18 of the shade 16 and also define a blurry zone in a range which covers the red and purple spectral zones, the existence of the red and purple spectral zones are made unnoticeable. In this embodiment, as the extent of the dispersion or divergence of the white rays refracted in the central lens areas A2, A3 and A4 is somehow small as compared with that in the first embodiment, the blurry zone will be slightly narrow. However, since the lens areas are so designed as to cover the color fringes, the latter can be positively made unnoticeable.

What is claimed is:

1. A projector-type head lamp for motor vehicles, comprising:

a reflector having a concave inner reflecting surface;

a light source;

a shade with a cut-off edge and a projection lens;

at least 2 foci formed on a straight line defining an optical axis of the reflector such that the rays of light emitted from said light source are reflected in a direction crossing said optical axis, said light source being disposed close to one of said foci, said cut-off edge of said shade being disposed in the vicinity of the other focus;

said projection lens comprising a central lens in which said optical axis lies and a peripheral lens extending outwardly from said central lens, said central lens further having a first focal point proximately along said optical axis, and said peripheral lens having a second focal point proximately along said optical axis; and said projection lens having a power of refraction which is progressively larger from the optical axis toward the outer circumference.

2. A projector-type head lamp according to claim 1, wherein said central lens area is composed of a plurality of lens areas defined according to the distance thereof from said optical axis and smoothly contiguous to each other, each of said lens areas being so formed as to refract the rays of light emitted from the point source at the infinitely far point on said optical axis and incident upon the frontal surface toward a point nearer to the cut-off edge of said shade as the lens area is farther from said optical axis.

3. A projector-type head lamp according to claim 1, wherein the inner reflecting surface of said reflector is designed in the form of a spheroid.

4. A projector-type head lamp according to claim 1, wherein the inner reflecting surface of said reflector consists of many different reflecting areas which reflect the rays of light from said light source toward different points, respectively, on the optical axis and are located between said predetermined point and the cut-off edge of said shade according their distance from said light source.

5. A projector-type head lamp according to claim 4, wherein the reflecting area including the inner and outer circumferences among said different reflecting areas is formed to reflect the rays of light from said light source toward the cut-off edge of said shade, while the remaining reflecting areas are formed to reflect the rays of light from said light source toward points nearer to the cut-off edge of said shade as they are farther from said optical axis.

* * * * *